(12) United States Patent
Dunkley et al.

(10) Patent No.: US 11,257,245 B1
(45) Date of Patent: Feb. 22, 2022

(54) METHOD AND DEVICE FOR DETECTION AND TRACKING OF LOW-TEXTURE OBJECTS

(71) Applicant: Apple Inc., Cupertino, CA (US)

(72) Inventors: Oliver Montague Welton Dunkley, Santa Clara, CA (US); Oliver Thomas Ruepp, Cupertino, CA (US); Aitor Aldoma Buchaca, Cupertino, CA (US); Jai Prakash, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 698 days.

(21) Appl. No.: 16/113,743

(22) Filed: Aug. 27, 2018

Related U.S. Application Data (60) Provisional application No. 62/556,849, filed on Sep. 11, 2017.

(51) Int. Cl.
| | | |
|---|---|---|
| *G06T 7/73* | (2017.01) | |
| *G06T 17/00* | (2006.01) | |
| *G06T 7/246* | (2017.01) | |
| *G01B 11/25* | (2006.01) | |

(52) U.S. Cl.
CPC ............ *G06T 7/73* (2017.01); *G01B 11/2513* (2013.01); *G06T 7/246* (2017.01); *G06T 17/00* (2013.01)

(58) Field of Classification Search
None
See application file for complete search history.

(56) References Cited

U.S. PATENT DOCUMENTS

| | | | | |
|---|---|---|---|---|
| 2015/0332505 | A1* | 11/2015 | Wang | G06T 15/06 345/633 |
| 2016/0373734 | A1* | 12/2016 | Cole | H04N 17/002 |
| 2017/0154462 | A1* | 6/2017 | von Cramon | G06T 7/586 |
| 2017/0287200 | A1* | 10/2017 | Forutanpour | G06T 1/20 |

* cited by examiner

*Primary Examiner* — David Perlman
(74) *Attorney, Agent, or Firm* — Fernando & Partners, LLP (57) ABSTRACT

In accordance with some embodiments, a method is performed at a device with one or more processors, non-transitory memory, and an image sensor. The method includes synthesizing, from image data that corresponds to a physical perspective of an object relative to the device, a surface mask characterizing a portion of a surface of the object based on a grid arranged on the object, wherein the grid is represented in the image data. The method includes generating a virtual perspective of a model associated with the object having a surface oriented to match the surface mask within a predefined confidence threshold.

21 Claims, 5 Drawing Sheets

METHOD AND DEVICE FOR DETECTION AND TRACKING OF LOW-TEXTURE OBJECTS

CROSS-REFERENCE TO RELATED APPLICATIONS

This application claims priority to U.S. Provisional Patent App. No. 62/556,849, filed on Sep. 11, 2017, which is hereby incorporated by reference in its entirety.

TECHNICAL FIELD

The present disclosure relates generally to displaying AR/VR content over a virtual model of a physical object.

BACKGROUND

Traditional object detection and tracking methods have difficulties accurately detecting and tracking low-texture objects.

SUMMARY

In accordance with some implementations, a method is performed at a device with one or more processors, non-transitory memory, and an image sensor. The method includes: synthesizing, from image data that corresponds to a physical perspective of an object relative to the device, a surface mask characterizing a portion of a surface of the object based on a grid arranged on the object, wherein the grid is represented in the image data; and generating a virtual perspective of a model associated with the object having a surface oriented to match the surface mask within a predefined confidence threshold.

In accordance with some implementations, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a device, cause the device to perform or cause performance of the operations of any of the methods described herein. In accordance with some implementations, a device includes means for performing or causing performance of the operations of any of the methods described herein.

DESCRIPTION

In embodiments described below, a method and device are described that enables detection and tracking of low-texture objects. This process reduces power usage and improves battery life of the device by enabling the device to detect and track objects more quickly and efficiently.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1A:
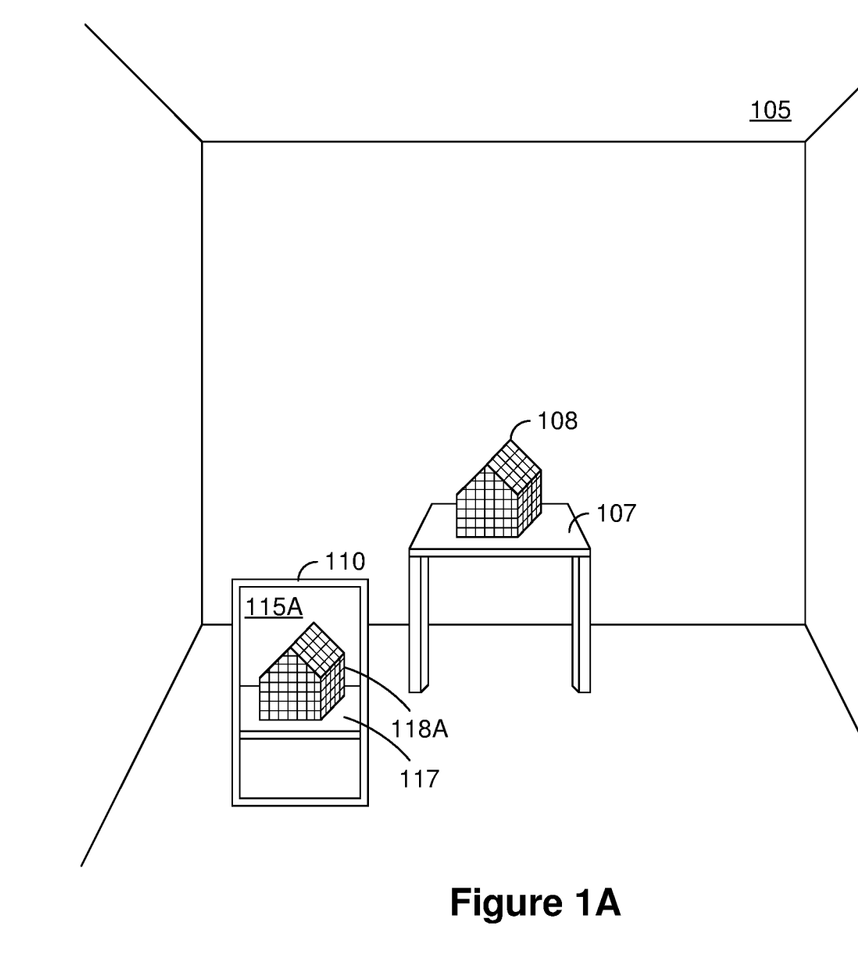
FIG. 1A illustrates a scene with an electronic device surveying the scene.

FIG. 1A illustrates a scene 105 with an electronic device 110 surveying the scene 105. The scene 405 includes a physical model 108 set upon a table 107. A grid (including a plurality of grid lines) is arranged on the physical model 108. In various implementations, the grid lines are etched, painted, adhered, stitched, projected, etc. onto the physical model 108. In some embodiments, the grid lines (which may be visible light or infrared light) are projected onto the physical model 108 by a grid projector of the electronic device.

The electronic device 110 displays, on a display, a representation of the scene 115A including a representation of the physical model 118A set upon a representation of the table 107. The representation of the physical model 118A includes a representation of the grid arranged on the physical model 108. In various implementations, the representation of the scene 115A is generated based on an image of the scene captured with an image sensor (e.g., a camera) of the electronic device 110 having a field-of-view directed toward the scene 105.

Figure 1B:
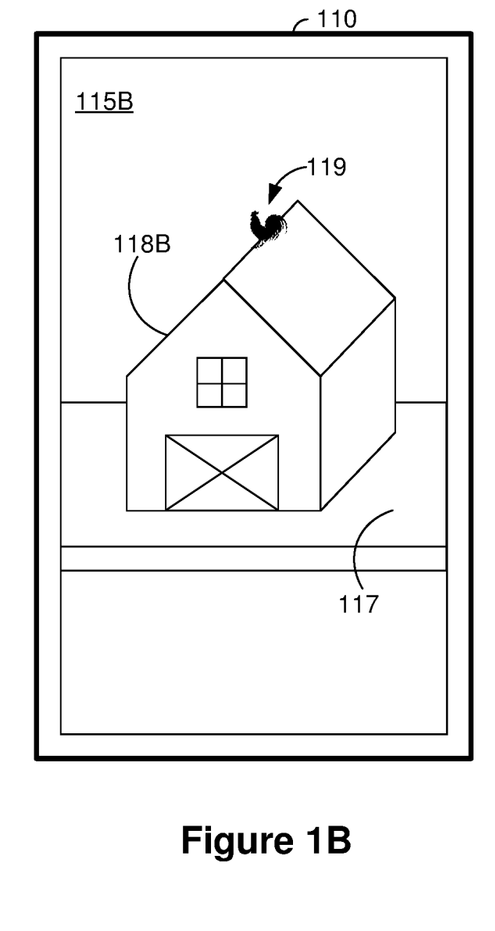
FIG. 1B illustrates the electronic device of FIG. 1A displaying a first AR/VR representation of the scene from a first perspective.

FIG. 1B illustrates the electronic device 110 displaying a first AR/VR representation of the scene 115B from a first perspective. The first AR/VR representation of the scene 115B includes a virtual model 118B (corresponding to an AR/VR representation of the physical model 108) set upon the representation of the table 117. The virtual model 118B does not include the grid arranged on the physical model 108. Rather, the first AR/VR representation of the scene 115B includes virtual surface textures (e.g., a window and barn door) overlaid on the virtual model 118B. Further, the first AR/VR representation of the scene 115B includes a virtual object 119 (e.g., a rooster).

Figure 1C:
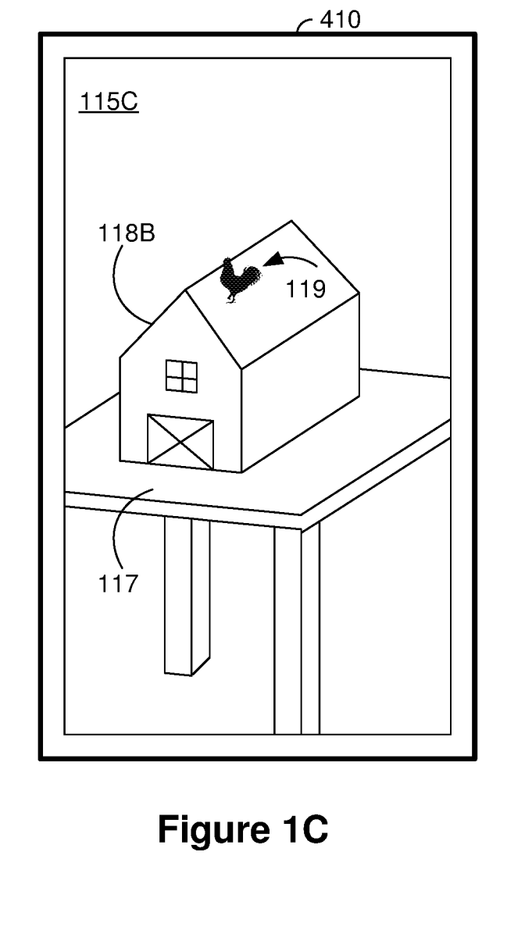
FIG. 1C illustrates the electronic device of FIG. 1A displaying a second AR/VR representation of the scene from a second perspective.

FIG. 1C illustrates the electronic device 110 displaying a second AR/VR representation of the scene 115C from a second perspective. In various implementations, the second AR/VR representation of the scene 115C is displayed in response to the electronic device 110 moving position relative to physical model 108. The second AR/VR representation of the scene 115C includes the virtual model 118B displayed from a different perspective than that shown in the first AR/VR representation of the scene 115B. Further, the second AR/VR representation of the scene 115C includes the representation of the table 117 displayed from the different perspective. The second AR/VR representation of the scene 115C further includes the virtual object 119.

Figure 2:
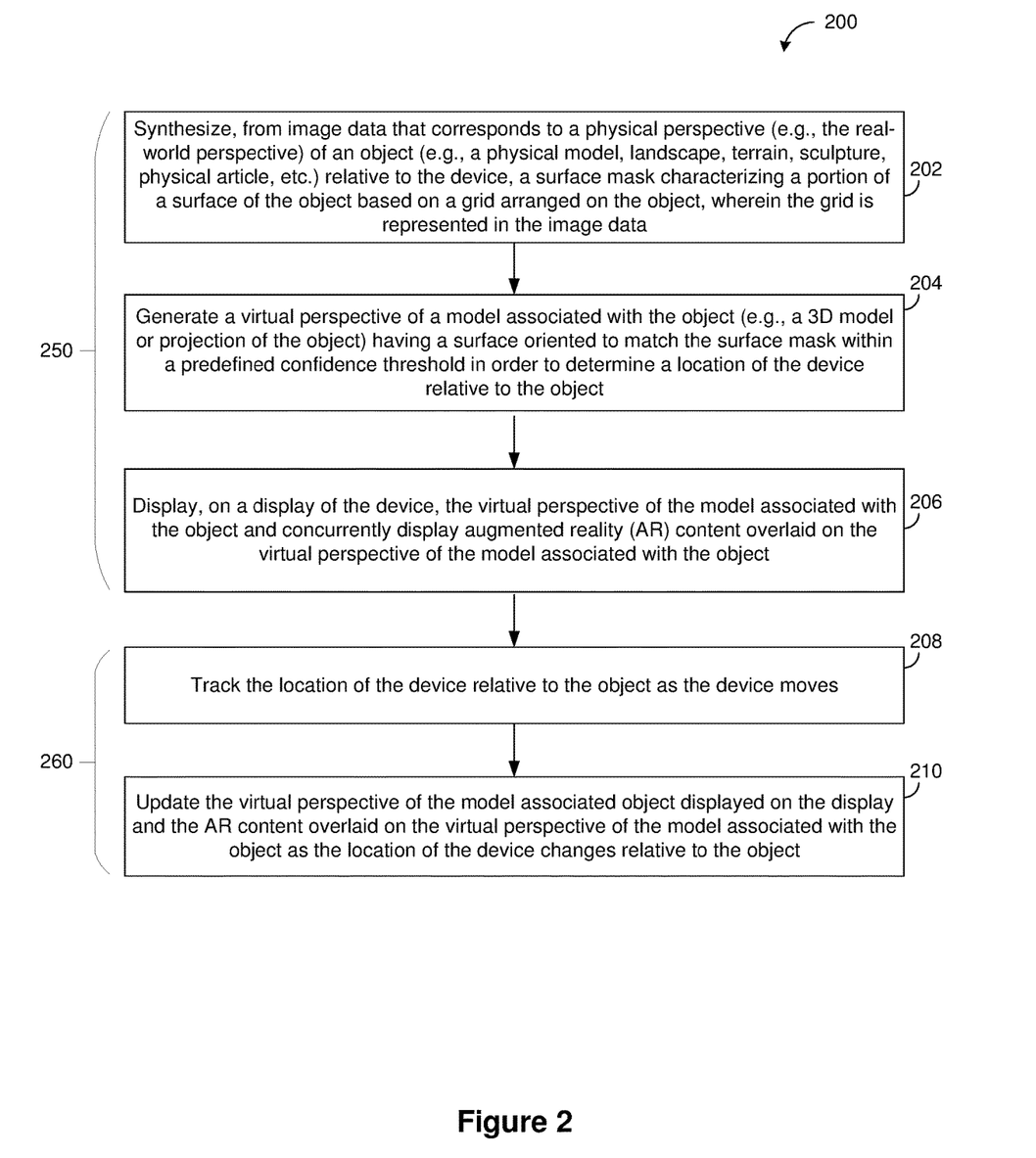
FIG. 2 is a flowchart representation of a method of detecting and tracking low-texture objects in accordance with some implementations.

FIG. 2 is a flowchart representation of a method 200 of detecting and tracking low-texture objects in accordance with some implementations. In some implementations (and as detailed below as an example), the method 200 is performed by a device (e.g., the electronic device 100 of FIG. 1 or the device 400 of FIG. 4) that includes: one or more processors, non-transitory memory, an image sensor, and, optionally, one or more displays. For example, the device corresponds to a portable electronic device such as a mobile phone, tablet, laptop computer, wearable computing device, or the like. For example, the image sensor corresponds to a complementary metal-oxide semiconductor (CMOS) sensor, charge-coupled device (CCD) sensor, infrared (IR) sensor, or the like. For example, the one or more optional displays correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the device also includes one or more input devices such as buttons, a touch-sensitive surface, keyboard, mouse, and/or the like.

In some implementations, the method 200 is performed by processing logic, including hardware, firmware, software, or a combination thereof. In some implementations, the method 200 is performed by a processor executing code stored in a non-transitory computer-readable medium (e.g., a memory). In brief, the method 200 includes: synthesizing, from image data that corresponds to a physical perspective (e.g., the real-world perspective) of an object (e.g., a physical model, landscape, terrain, sculpture, physical article, etc.) relative to the device, a surface mask characterizing a portion of a surface of the object based on a grid arranged on the object, wherein the grid is represented in the image data; and generating a virtual perspective of a model (e.g., a 3D model or projection of the object) associated with the object having a surface oriented to match the surface mask within a predefined confidence threshold in order to determine a location of the device relative to the object.

As shown in FIG. 2, the process 200 includes a detection and initialization phase 250 including blocks 202, 204, and 206. In some implementations, during the detection and initialization phase 150, the device detects an object (e.g., a physical model), determines its location relative to the object, and initiates/presents an AR/VR experience associated with the object. The process 200 also includes a tracking phase 260 including blocks 208 and 210. In some implementations, during the tracking phase 260, the device tracks its location relative to the object as the device moves and the device updates the AR/VR experience associated with the object accordingly.

The method 200 begins, in block 202, with the device synthesizing, from image data that corresponds to a physical perspective (e.g., the real-world perspective) of an object (e.g., a physical model, landscape, terrain, sculpture, physical article, etc.) relative to the device, a surface mask characterizing a portion of a surface of the object based on a grid arranged on the object, wherein the grid is represented in the image data. As example implementation of synthesizing a surface mask is described in detail below with respect to FIG. 3.

In some implementations, the object corresponds to a physical model with grid lines thereon. For example, the grid lines are etched, painted, adhered, stitched, projected, etc. onto the object. In some implementations, the device captures image data of the object (e.g., a physical model) using an image sensor. As one example, the object corresponds to a physical architectural model. As another example, the object corresponds to a physical model of a landscape or terrain. In some implementations, the device obtains (e.g., captures, receives, or retrieves) the image data, via the image sensor, that includes the physical perspective of the object.

As an example, in FIG. 1A, the device displays the image data (e.g., the representation of the scene 115A) that corresponds to a physical perspective of an object. (e.g., the physical model 108).

At block 204, the device generates a virtual perspective of a model associated with the object (e.g., a 3D model or projection of the object) having a surface oriented to match the surface mask within a predefined confidence threshold in order to determine a location of the device relative to the object. In some implementations, the device first initializes its perspective/orientation relative to the object based on the model. Then, the device tracks its position relative to the object using known tracking techniques. As such, the device presents the 3D model, for example, on its display with AR content that matches the current perspective of the object. In some implementations, if the perspective does not meet the confidence threshold, the device continues to iterate the process until a perspective of the 3D model is found that satisfies the predefined confidence threshold (e.g., associated with a unique virtual perspective).

In some implementations, the device identifies the model that corresponds to the object from a library that includes a plurality of models. As one example, the device stores a library of 3D models of objects, landscapes, etc. As another example, the device has access to a database of 3D models for objects, landscapes, terrain, etc.

At block 206, the device displays, on a display of the device, the virtual perspective of the model associated with the object and concurrently displays augmented reality (AR) content overlaid on the virtual perspective of the model associated with the object. As one example, the AR content corresponds to energy being delivered and consumed by residents of a city or building. As another example, the AR content corresponds to the HVAC system of a building. As yet another example, the AR content corresponds to water being delivered and consumed by residents of a city or building. As yet another example, the AR content corresponds to atmospheric conditions overlaid on a landscape, terrain, city, etc.

As an example, in FIG. 1B, the electronic device 110 displays a virtual perspective of the model associated with the object (e.g., the virtual model 118B) and concurrently displays AR content (e.g., the virtual surface textures of the virtual model 118B and/or the virtual object 119) overlaid on the a virtual perspective of the model associated with the object.

At block 208, the device tracks the location of the device relative to the object as the device moves. In various implementations, the device tracks the location using visual odometry. In various implementations, the device tracks the location using visual inertial odometry (e.g., by way of a inertial measurement unit, accelerometer, gyroscope, etc.).

At block 210, the device updates the virtual perspective of the model associated object displayed on the display and the AR content overlaid on the virtual perspective of the model associated with the object as the location of the device changes relative to the object.

As an example, in FIG. 1C, the electronic device updates the virtual perspective of the model associated with the object displayed on the display by displaying the virtual model 118B from a different perspective than that shown in FIG. 1B.

Figure 3:
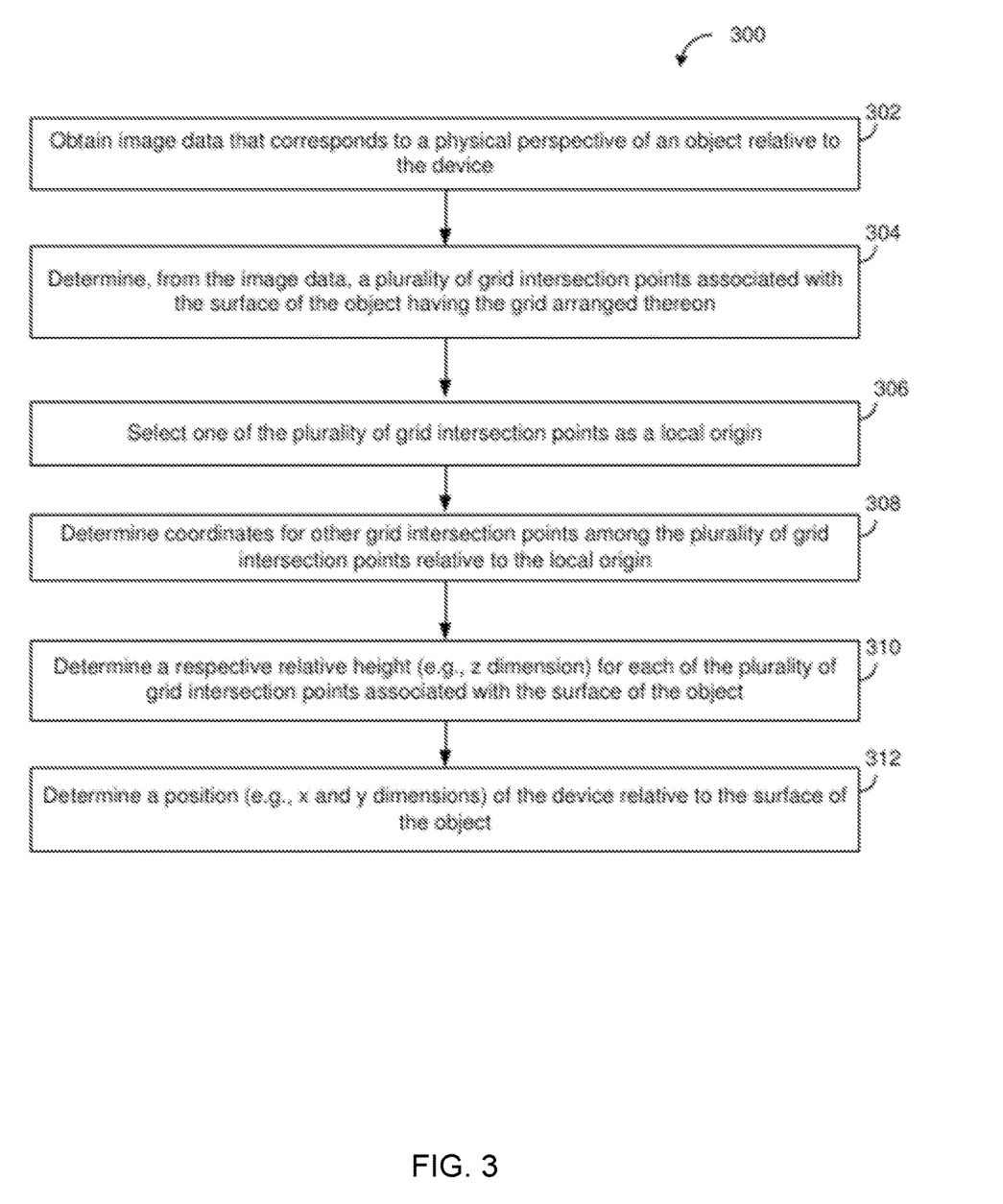
FIG. 3 is a flowchart representation of a method of synthesizing a surface mask characterizing a portion of a surface of an object in accordance with some implementations.

FIG. 3 is a flowchart representation of a method 300 of synthesizing a surface mask characterizing a portion of a surface of an object associated with block 202 in FIG. 2 in accordance with some implementations. In some implementations (and as detailed above with reference to FIG. 2 as an example), the method 300 is performed by a device (e.g., the electronic device 100 of FIG. 1 or the device 400 in FIG. 4) or a portion thereof (e.g., the physical perspective synthesizing unit 444 in FIG. 4) that includes: one or more processors, non-transitory memory, an image sensor, and, optionally, one or more displays. For example, the device corresponds to a portable electronic device such as a mobile phone, tablet, laptop computer, wearable computing device, or the like.

In some implementations, the method 300 is performed by processing logic, including hardware, firmware, software, or a combination thereof. In some implementations, the method 300 is performed by a processor executing code stored in a non-transitory computer-readable medium (e.g., a memory).

The method 300 begins, in block 302, with the device obtaining image data that corresponds to a physical perspective of an object relative to the device.

At block 304, the device determines, from the image data, a plurality of grid intersection points associated with the surface of the object having the grid arranged thereon.

At block 306, the device selects one of the plurality of grid intersection points as a local origin. At block 308, the device determines coordinates for other grid intersection points among the plurality of grid intersection points relative to the local origin. In some implementations, after determining/identifying the plurality of grid intersection points, the device selects one of the grid intersection as an origin and determines local coordinates for the plurality of grid intersections (e.g., the distance between intersections is a predefined value such as 5 cm, 10 cm, 20 cm, etc.).

At block 310, the device determines a respective relative height (e.g., z dimension) for each of the plurality of grid intersection points associated with the surface of the object. At block 312, the device determines a position (e.g., x and y dimensions) of the device relative to the surface of the object. For example, assuming that the z dimension of the device is set to 0 and the distance between grid intersections is known, the z dimension (height) is unknown for the plurality of grid intersection points, and the x and y dimensions for the device are unknown. In this example, one of ordinary skill in the art would know how to solve for the unknowns in this system of equations using linear algebra techniques.

Figure 4:
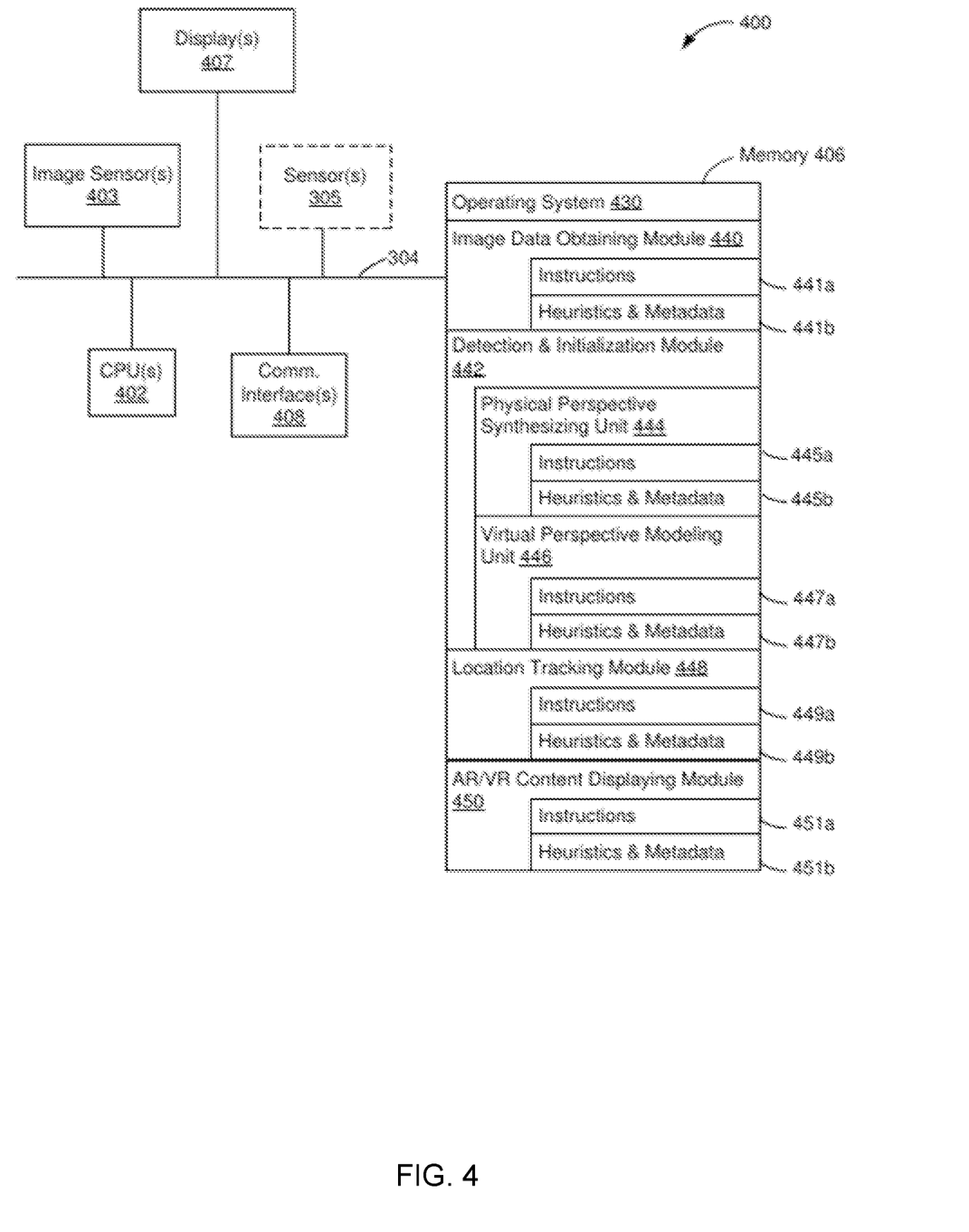
FIG. 4 is a block diagram of a device in accordance with some implementations.

FIG. 4 is a block diagram of a device 400 in accordance with some implementations. For example, the device corresponds to a portable electronic device such as a mobile phone, tablet, laptop computer, wearable computing device, or the like. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some implementations the device 400 includes one or more processing units (CPUs) 402 (e.g., processors), one or more image sensors 403, one or more optional sensors 405, one or more displays 407, one or more communication interfaces 408 (e.g., a network interface), a memory 406, and one or more communication buses 404 for interconnecting these and various other components.

In some implementations, the one or more image sensors 403 correspond to CMOS sensors, CCD sensors, IR sensors, or the like. In some implementations, the one or more optional sensors 405 corresponds to one of a proximity sensor, ultrasonic sensor, depth sensors, LiDAR, GPS, speedometer, accelerometer, torque sensor, photoresistor, humistor, temperature sensor, and/or the like. In some implementations, the one or more displays 407 corresponds to holographic, DLP, LCD, LCoS, OLET, OLED, SED, FED, QD-LED, MEMS, and/or the like display types.

In some implementations, the communication buses 404 include circuitry that interconnects and controls communications between system components. The memory 406 includes high-speed random-access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid-state storage devices. The memory 406 optionally includes one or more storage devices remotely located from the CPU(s) 402. The memory 406 comprises a non-transitory computer readable storage medium. In some implementations, one or more instructions are included in a combination of logic and non-transitory memory. Moreover, in some implementations, the memory 406 or the non-transitory computer readable storage medium of the memory 406 stores the following programs, modules and data structures, or a subset thereof including an optional operating system 430, an image data obtaining module 440, a detection and initialization module 442, a location tracking module 448, and an augmented reality/virtual reality (AR/VR) content displaying module 450.

The operating system 430 includes procedures for handling various basic system services and for performing hardware dependent tasks.

In some implementations, the image data obtaining module 440 is configured to obtain (e.g., capture via the one or more image sensors 403, receive, or retrieve) image data that corresponds to a physical perspective (e.g., the real-world perspective) of an object (e.g., a physical model, landscape, terrain, sculpture, physical article, etc.) relative to the device 400. To that end, the image data obtaining module 440 includes a set of instructions 441a and heuristics and metadata 441b.

In some implementations, the detection and initialization module 442 is configured to detect an object (e.g., a physical model), determine the location of the device 400 relative to the object, and initiate/present an AR/VR experience associated with the object. To that end, the detection and initialization module 442 includes a physical perspective synthesizing unit 444 and a virtual perspective modeling unit 446.

In some implementations, the physical perspective synthesizing unit 444 is configured to synthesize, from the image data that, a surface mask characterizing a portion of a surface of the object based on a grid arranged on the object, wherein the grid is represented in the image data. To that end, the physical perspective synthesizing unit 444 includes a set of instructions 445a and heuristics and metadata 445b.

In some implementations, the virtual perspective modeling unit 446 is configured to generate a virtual perspective of a model associated with the object (e.g., a 3D model or projection of the object) having a surface oriented to match the surface mask within a predefined confidence threshold in order to determine a location of the device relative to the object in order to determine a location of the device relative to the object. To that end, the virtual perspective modeling unit 446 includes a set of instructions 447a and heuristics and metadata 447b.

In some implementations, the location tracking module 448 is configured to track the location of the device 400 relative to the object as the device 400 moves. To that end, the location tracking module 448 includes a set of instructions 449a and heuristics and metadata 449b.

In some implementations, the AR/VR content displaying module 450 is configured to display and update AR content overlaid on the virtual perspective of the model associated with the object displayed on the one or more displays 407. To that end, the AR/VR content displaying module 450 includes a set of instructions 451a and heuristics and metadata 451b.

Although the image data obtaining module 440, the detection and initialization module 442, the location tracking module 448, and the AR/VR content displaying module 450 are illustrated as residing on a single device 400, it should be understood that in other embodiments, any combination of the units can reside in/on separate devices in various implementations.

Moreover, FIG. 4 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at a device with one or more processors, non-transitory memory, and an image sensor:
obtaining image data that corresponds to a physical perspective of a physical object relative to the device, wherein the image data includes a grid arranged on the physical object;
synthesizing, from the image data, a surface mask characterizing a portion of a surface of the physical object based on the grid arranged on the physical object; and
generating a virtual perspective of a virtual model, associated with the physical object, having a virtual surface oriented based on the surface mask of the physical object according to a determination that the virtual surface matches the surface mask of the physical object within a predefined confidence threshold.

2. The method of claim 1 further comprising, displaying, on a display of the device, the virtual perspective of the virtual model associated with the physical object and concurrently displaying augmented reality (AR) content overlaid on the virtual perspective of the virtual model associated with the physical object.

3. The method of claim 1, wherein the grid lines are at least one of painted on the object, etched into the physical object, projected onto the physical object, stitched into the physical object, or adhered onto the physical object.

4. The method of claim 1, wherein the physical object corresponds to a physical architectural model.

5. The method of claim 1, wherein the physical object corresponds to a physical model of a landscape or terrain.

6. The method of claim 1, wherein synthesizing the surface mask characterizing the portion of the surface of the physical object includes:
determining, from the image data that corresponds to the physical perspective of the physical object relative to the device, a plurality of grid intersection points associated with the surface of the physical object having the grid arranged thereon;
determining a respective relative height for each of the plurality of grid intersection points associated with the surface of the physical object; and
determining a position of the device relative to the surface of the physical object.

7. The method of claim 6, wherein synthesizing the surface mask characterizing the portion of the surface of the physical object further includes:
selecting one of the plurality of grid intersection points as a local origin; and
determining coordinates for other grid intersection points among the plurality of grid intersection points relative to the local origin.

8. The method of claim 1 further comprising, after generating the virtual perspective of the virtual model associated with the physical object, updating a location of the device relative to the physical object as the device moves.

9. The method of claim 1 further comprising capturing, via the image sensor, the image data that includes the physical perspective of the physical object.

10. A non-transitory memory storing one or more programs, which, when executed by one or more processors of a device with one or more image sensors and one or more displays, cause the device to:
obtain image data that corresponds to a physical perspective of a physical object relative to the device, wherein the image data includes a grid arranged on the physical object;
synthesize, from the image data, a surface mask characterizing a portion of a surface of the physical object based on the grid arranged on the physical object; and
generate a virtual perspective of a virtual model, associated with the physical object, having a virtual surface oriented based on the surface mask of the physical object according to a determination that the virtual surface matches the surface mask of the physical object within a predefined confidence threshold.

11. The non-transitory memory of claim 10, wherein the programs further cause the device to, display, on the one or more displays, the virtual perspective of the virtual model associated with the physical object and concurrently display augmented reality (AR) content overlaid on the virtual perspective of the virtual model associated with the physical object.

12. The non-transitory memory of claim 10, wherein the grid lines are at least one of painted on the physical object, etched into the physical object, projected onto the physical object, stitched into the physical object, or adhered onto the physical object.

13. The non-transitory memory of claim 10, wherein the programs cause the device to synthesize the surface mask characterizing the portion of the surface of the physical object by:
determining, from the image data that corresponds to the physical perspective of the physical object relative to the device, a plurality of grid intersection points associated with the surface of the physical object having the grid arranged thereon;
determining a respective relative height for each of the plurality of grid intersection points associated with the surface of the physical object; and
determining a position of the device relative to the surface of the physical object.

14. The non-transitory memory of claim 10, wherein the programs further cause the device to, after generating the virtual perspective of the virtual model associated with the physical object, update a location of the device relative to the physical object as the device moves.

15. A device comprising:
one or more processors;
a non-transitory memory;
one or more image sensors;
one or more displays; and
one or more programs stored in the non-transitory memory, which, when executed by the one or more processors, cause the device to:
obtain image data that corresponds to a physical perspective of a physical object relative to the device, wherein the image data includes a grid arranged on the physical object;
synthesize, from the image data, a surface mask characterizing a portion of a surface of the physical object based on the grid arranged on the physical object; and
generate a virtual perspective of a virtual model associated with the physical object, having a virtual surface oriented based on the surface mask of the physical object according to a determination that the virtual surface matches the surface mask of the physical object within a predefined confidence threshold.

16. The device of claim 15, wherein the programs further cause the device to, display, on the one or more displays, the virtual perspective of the virtual model associated with the physical object and concurrently display augmented reality (AR) content overlaid on the virtual perspective of the virtual model associated with the physical object.

17. The device of claim 15, wherein the grid lines are at least one of painted on the physical object, etched into the physical object, projected onto the physical object, stitched into the physical object, or adhered onto the physical object.

18. The device of claim 15, wherein the programs cause the device to synthesize the surface mask characterizing the portion of the surface of the physical object by:
    determining, from the image data that corresponds to the physical perspective of the physical object relative to the device, a plurality of grid intersection points associated with the surface of the physical object having the grid arranged thereon;
    determining a respective relative height for each of the plurality of grid intersection points associated with the surface of the physical object; and
    determining a position of the device relative to the surface of the physical object.

19. The device of claim 15, wherein the programs further cause the device to, after generating the virtual perspective of the virtual model associated with the physical object, update a location of the device relative to the physical object as the device moves.

20. The method of claim 1, further comprising:
    forgoing generation of the virtual perspective of the virtual model associated with the physical object according to a determination that the virtual surface does not match the surface mask of the physical object within the predefined confidence threshold.

21. The method of claim 1, further comprising:
    identifying the virtual model from a library that includes a plurality of virtual models based at least in part on the image data that corresponds to the physical perspective of the physical object relative to the device.

* * * * *